US007640086B2

(12) United States Patent
Nakashima et al.

(10) Patent No.: US 7,640,086 B2
(45) Date of Patent: Dec. 29, 2009

(54) RUNNING OBJECT AND METHOD OF CONTROLLING THE SAME

(75) Inventors: Issei Nakashima, Toyota (JP); Toshio Fuwa, Nisshin (JP); Yoshikazu Motozono, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 407 days.

(21) Appl. No.: 11/515,946

(22) Filed: Sep. 6, 2006

(65) Prior Publication Data

US 2007/0073425 A1    Mar. 29, 2007

(30) Foreign Application Priority Data

Sep. 6, 2005    (JP) .............................. 2005-257497

(51) Int. Cl.
*A61G 5/06* (2006.01)
(52) U.S. Cl. ............................ 701/36; 701/22; 180/6.5; 280/250.1
(58) Field of Classification Search ................. 180/907, 180/7.1, 8.1, 8.2, 8.3; 280/5.2, 5.28; 700/253, 700/261; 701/36
See application file for complete search history.

(56) References Cited

U.S. PATENT DOCUMENTS 6,003,624 A * 12/1999 Jorgensen et al. ............ 180/6.5

6,353,949 B1 * 3/2002 Falbo ............................ 5/610
6,553,271 B1    4/2003 Morrell

FOREIGN PATENT DOCUMENTS

JP    63-305082    12/1988

OTHER PUBLICATIONS

Y. Takahashi, N. Ishikawa, and T. Hagiwara, "Soft Raising and Lowering of Front Wheels for Inverse Pendulum Control Wheel Chair Robot," In Proc. IEEE/RSJ International Conference on Intelligent Robots and Systems, 2003, pp. 3618-3623.*

* cited by examiner

*Primary Examiner*—Thomas G Black
*Assistant Examiner*—Peter D Nolan
(74) *Attorney, Agent, or Firm*—Finnegan, Henderson, Farabow, Garrett & Dunner, LLP

(57) ABSTRACT

A running object includes a body, at least two drive wheels disposed on a first axle, and at least one driven wheel disposed on a second axle. The running object is capable of switching between a standing posture in which the driven wheel is suspended in the air and a stable posture in which the driven wheel is placed on the ground. The running object includes a storing device that stores a target incline pattern that chronologically describes the target incline angle of the body during a transition from the standing posture to the stable posture; a detecting device that detects the incline angle and/or the incline angular velocity of the body; a torque calculating device that calculates torque based on a deviation between the target incline pattern stored in the storing device and a detection value detected by the detecting device; and an actuator for applying the torque calculated by the calculating device to the drive wheels.

6 Claims, 6 Drawing Sheets

RUNNING OBJECT AND METHOD OF CONTROLLING THE SAME

CROSS-REFERENCE TO RELATED APPLICATION

This application claims priority to Japanese Patent Application No. 2005-257497 filed on Sep. 6, 2005, the contents of which are hereby incorporated by reference into the present application.

BACKGROUND OF THE INVENTION

1. Field of the Invention

The present invention relates to a running object comprising a body, at least two drive wheels disposed on a first axel, and at least one driven wheel disposed on a second axel. The running object is capable of switching between a standing posture and a stable posture. In the standing posture, the driven wheel is suspended in the air, and in the stable posture, the driven wheel is placed on a ground.

2. Description of the Related Art

Technology related to the running object described above is disclosed in the following references.

(1) U.S. Pat. No. 6,553,271

(2) Yoshihiko Takahashi and two others, "Human Assistance Robot (First Report) Wheelchair Prototype That Will Perform Wheelies", The Japan Society Of Mechanical Engineers (No. 99-9), Robotics•Mechatronics Conference 1999 Conference Papers, June 1999, 1A1-75-106 (1) to 1A1-75-106 (2)

A running object capable of switching between the standing posture and the stable posture can stably run and stop while the stable posture is maintained in which the drive wheels and the driven wheel are placed on the ground. Also the running object can stably run and stop while the standing posture is maintained in which only the drive wheels are placed on the ground and the driven wheel is suspended in the air. The running object can turn in small radius while maintaining the standing posture. In addition, the running object can maintain a perpendicular posture while maintaining the standing posture, even when a steep upslope and downslope are encountered. It is anticipated that the range of usage of the running object will be enlarged when the running object is capable of switching between the standing posture and the stable posture.

BRIEF SUMMARY OF THE INVENTION

The conventional running object will transit from the stable posture to the standing posture by initiating a control program for maintaining the standing posture. And the conventional running object will transit from the standing posture to the stable posture by stopping the control program for maintaining the standing posture.

In the conventional method, there will be occasions that the driven wheel will hard hit the ground when transiting from the standing posture to the stable posture. When the driven wheel hard hits the ground, a strong reaction will be applied to the running object, and the balance of the running object will be disturbed.

The present invention solves the aforementioned problem. The present invention provides technology that can bring the driven wheel into gentle contact with the ground when transiting from the standing posture in which the driven wheel is suspended in the air to the stable posture in which the driven wheel is placed on the ground.

The running object of the present teachings is provided with a body, at least two drive wheels disposed on a first axel, and at least one driven wheel disposed on a second axel. The running object further includes a storage device that stores a target incline pattern that chronologically describes a target incline angle of the body during the transition from the standing posture to the stable posture, a detecting device that detects an incline angle and/or an incline angular velocity of the body, a torque calculating device that calculates torque based on a deviation between the target incline pattern stored in the storage device and a detection value detected by the detecting device, and an actuator for applying the torque calculated by the torque calculating device to the drive wheels.

When the running object transits from the standing posture to the stable posture, the velocity at which the driven wheel approaches the ground will correspond to the incline angular velocity of the body. Because of that, the velocity at which the driven wheel approaches the ground can be adjusted by adjusting the incline angular velocity of the body. The driven wheel can be gently brought into contact with the ground if the incline angular velocity of the body is slowed down before grounding.

In contrast, when the incline angular velocity of the body is excessively restricted, a long period of time will be needed to transit from the standing posture to the stable posture, and the running object must run a significant distance to transit from the standing posture to the stable posture. In this case, the running object cannot transit from the standing posture to the stable posture unless a sufficient space is ensured.

Due to the above, if the incline angular velocity of the body can be set relatively high in an early stage of the transition from the standing posture to the stable posture, and the incline angular velocity of the body is slowed down in a later stage of the transition, it will be possible for the driven wheel to gently contact the ground. It is useful to adjust the incline angular velocity of the body during the transition.

The running object of the present teachings stores the target incline pattern that chronologically describes the target incline angle of the body during the transition from the standing posture to the stable posture. When the running object transits from the standing posture to the stable posture, the incline angle of the body will be adjusted to follow the target incline pattern. In this way, for example, the incline angular velocity of the body can be set relatively high in an early stage of the transition, and the incline angular velocity of the body can be slowed down in a later stage of the transition. The driven wheel gently contacts the ground.

According to this running object, the driven wheel will be brought into gentle contact with the ground when transiting from the standing posture to the stable posture. Also, an excessive amount of space will not be needed.

In the aforementioned running object, it is preferable that velocity of the target incline angle stored in the storage device is restricted to a predetermined velocity or lower within a range in which the target incline angle exceeds a predetermined incline angle.

The incline angle of the body when the driven wheel contacts the ground will change depending upon the incline and roughness of the road surface. In order to control the incline angular velocity of the body to be slow when the driven wheel contacts the ground regardless of the incline or roughness of the road surface, the incline angular velocity of the body must be controlled to be slow in a range that there is likelihood that the driven wheel contacts the ground.

When the target incline angle exceeds the predetermined incline angle, there is likelihood that the driven wheel contacts the ground. If the velocity of the target incline angle is restricted to a predetermined velocity or lower within a range in which the target incline angle exceeds the predetermined incline angle, the driven wheel will be gently brought into contact with the road surface, regardless of the incline or roughness of the road surface.

The predetermined incline angle, i.e., the incline angle at which it becomes possible for the driven wheel to contact the ground, is preferably calculated by subtracting a predetermined angle from the incline angle of the body when the running object is in the stable posture on a level surface. The predetermined angle can be determined based on the incline of the road surface, and/or the degree of roughness of the road surface The running object is preferably provided with a device that corrects the target incline pattern based on an incline angle and an incline angular velocity detected at the start timing of the transition from the standing posture to the stable posture.

In this way, the transition from the standing posture to the stable posture can be performed without any discomfort.

The running object is preferably provided with a second detecting device that detects a rotational angular velocity of the drive wheels, and a device that determines whether or not the driven wheel is placed on the ground based on the rotational angular velocity of the drive wheels detected by the second detecting device.

The incline angle of the body will be adjusted by means of torque applied to the drive wheels by the actuator. When the driven wheel is placed on the ground and the incline of the body is prohibited, the rotational angular velocity of the drive wheels will be significantly changed. Because of that, it will be possible to determine whether or not the driven wheel is placed on the ground by observing the rotational angular velocity of the drive wheels. By using the rotational angular velocity of the drive wheels, it can be correctly determined whether or not the driven wheel is placed on the ground, even when the incline of the road surface or the roughness of the road surface is unknown.

The technology of the present teachings can also be embodied in a method of controlling the running object. The method of controlling the running object comprises storing the target incline pattern that chronologically describes the target incline angle of the body during the transition from the standing posture to the stable posture, detecting the incline angle and/or the incline angular velocity of the body, calculating torque based on a deviation between the target incline pattern stored in the storing step and a detection value detected in the detecting step, and activating an actuator for applying torque to the drive wheels such that the torque calculated in the calculating step is applied to the drive wheels.

By using this method to control the operation of the running object, the driven wheel can be brought into gentle contact with the ground when transiting from the standing posture to the stable posture. An excessive amount of space will not be needed.

According to the present teachings, when transiting from the standing posture to the stable posture, the driven wheel can be gently placed on the ground, the balance of the body will be prevented from being disturbed, and the running object will be prevented from tipping over. By adopting the present teachings in a passenger type running object, the running object having a superior ride can be obtained.

DETAILED DESCRIPTION OF THE INVENTION

First, important features of the embodiment described below will be enumerated.

(Feature 1) The running object is provided with a passenger seat in which a passenger can sit, and the passenger can be carried by the running object.

(Feature 2) The running object is provided with an operation device that allows the passenger to operate the running object.

(Feature 3) The target incline angle and the target incline angular velocity of the vehicle body during the transition from the standing posture to the stable posture is chronologically described in the target incline pattern.

Figure 1:
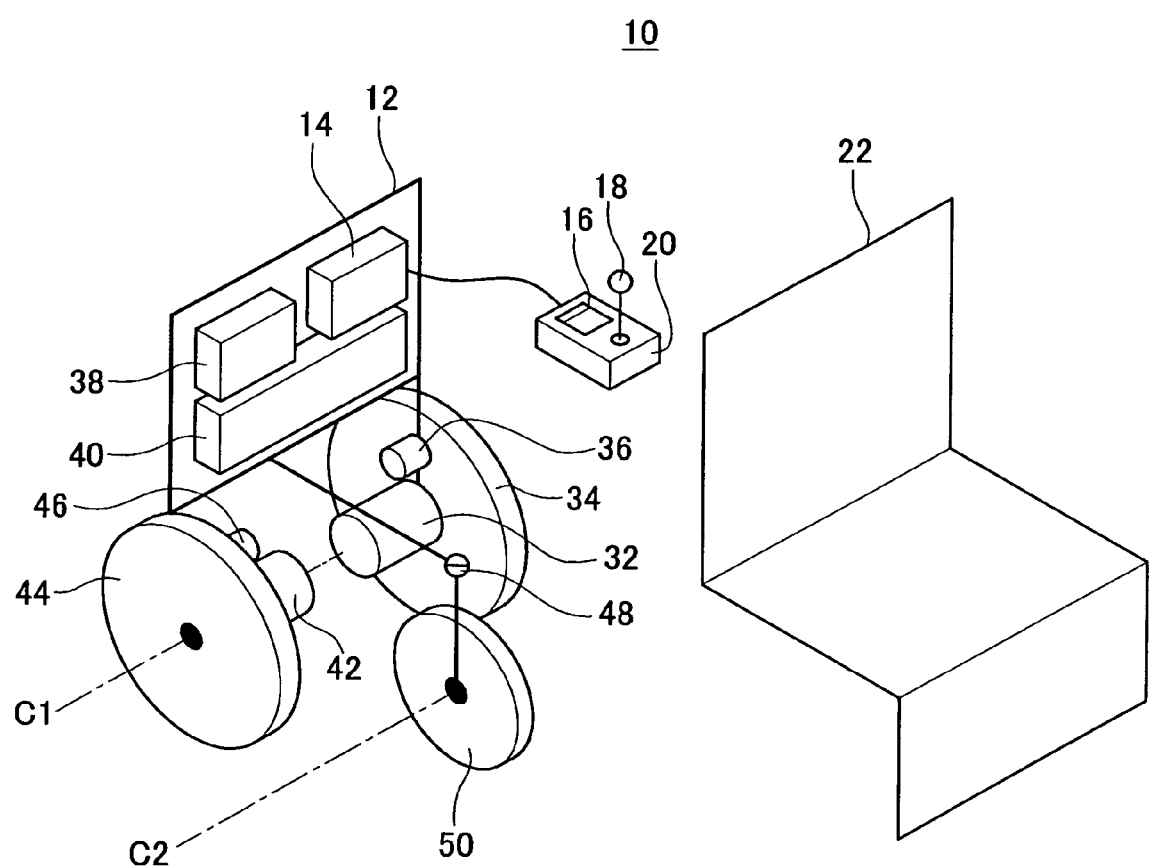
FIG. 1 schematically illustrates a structure of a running object of an embodiment.

An embodiment of the present teachings will be described with reference to the drawings. FIG. 1 schematically illustrates an overall structure of a running object 10 of the present embodiment. Note that in order to understand the structure of the running object 10, a portion of the structure will be shown disassembled. The running object 10 comprises a vehicle body 12, and a first drive wheel 34, a second drive wheel 44, and a driven wheel 50 arranged on the vehicle body 12. The first drive wheel 34 and the second drive wheel 44 are rotatable around a first axel C1. The driven wheel 50 is rotatable around a second axle C2. The first axle C1 is positioned on the rear side of the vehicle body 12, and the second axle C2 is positioned on the front side of the vehicle body 12. The second axle C2 is arranged on the vehicle body 12 via a thrust bearing 48. A passenger seat 22 in which a person can sit is arranged on the running object 10. The running object 10 can run while carrying a person.

The running object 10 comprises a first motor 32 that drives the first drive wheel 34, a second motor 42 that drives the second drive wheel 44, and a battery module 40 that supplies electric power to both motors 32, 42. The motors 32, 42, which are actuators for the drive wheels 34, 44 respectively, are configured so as to independently drive each drive wheel 34, 44.

The running object 10 comprises a control module 14 that controls the operation of the first motor 32 and the second motor 42, and an operation module 20 that the passenger of the running object 10 will operate. The control module 14 will respond to the operation applied to the operation module 20 by the passenger of the running object 10, and will control the operation of the first motor 32 and the second motor 42.

Figure 2:
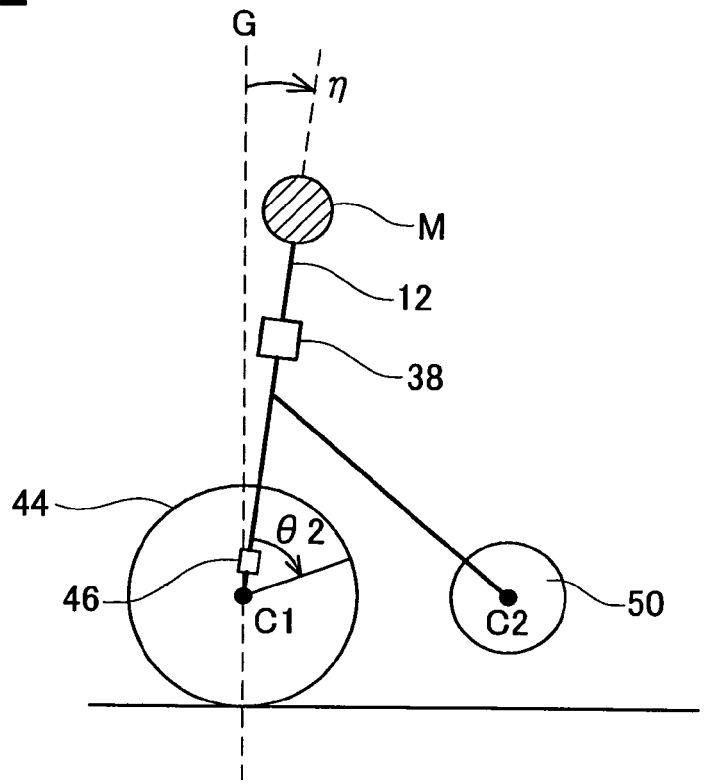
FIG. 2 schematically illustrates the running object in the standing posture.

The running object 10 comprises a gyro 38 that detects an incline angular velocity of the vehicle body 12, a first encoder 36 that will detect a rotation angle of the first drive wheel 34, and a second encoder 46 that will detect a rotation angle of the second drive wheel 44. The incline angular velocity of the vehicle body 12 is a change rate of the incline angle of the vehicle body 12. The incline angle of the vehicle body 12 indicates the rotation angle (posture angle) around the first axle C1 of the vehicle body 12. As shown in FIG. 2, in the present embodiment, the state in which the center of gravity M of the running object 10 (excluding the drive wheels 34, 44) is positioned directly above the first axle C1 will be the reference point for the incline angle $\eta$. When the vehicle body 12 is at an angle where the center of gravity M is positioned directly above the first axle C1, the incline angle $\eta$ is zero. When the vehicle body 12 is inclined toward the driven wheel 50, the incline angle $\eta$ is positive.

The rotation angle of each drive wheel 34, 44 is the relative rotation angle with respect to the vehicle body 12 of each drive wheel 34, 44. Note that in FIG. 2, the rotation angle $\theta 2$ of the second drive wheel 44 is illustrated. Note that the rotation angle of the first drive wheel 34 will be referred to as $\theta 1$.

An operation lever 18 and a transition switch 16 are arranged on the operation module 20. The operation lever 18 is an operation member for the passenger to adjust the running velocity and running direction of the running object 10. The passenger can adjust the running velocity of the running object 10 by adjusting the operation amount of the operation lever 18. In addition, the passenger can adjust the running direction of the running object 10 by adjusting the direction of operation of the operation lever 18. The running object 10 can advance, stop, reverse, turn left, turn right, rotate left, and rotate right in response to an operation inputted to the operation lever 18. The transition switch 16 is an operation member for switching posture of the running object 10. The passenger of the running object 10 can freely switch the posture of the running object 10 between the standing posture and the stable posture.

FIG. 2 schematically illustrates the running object 10 in the standing posture. As shown in FIG. 2, in the standing posture, the driven wheel 50 is suspended in the air, and only the first drive wheel 34 and the second drive wheel 44 are placed on the ground. The running object 10 can maintain the standing posture while running, rotating, or being substantially stationary.

Figure 3:
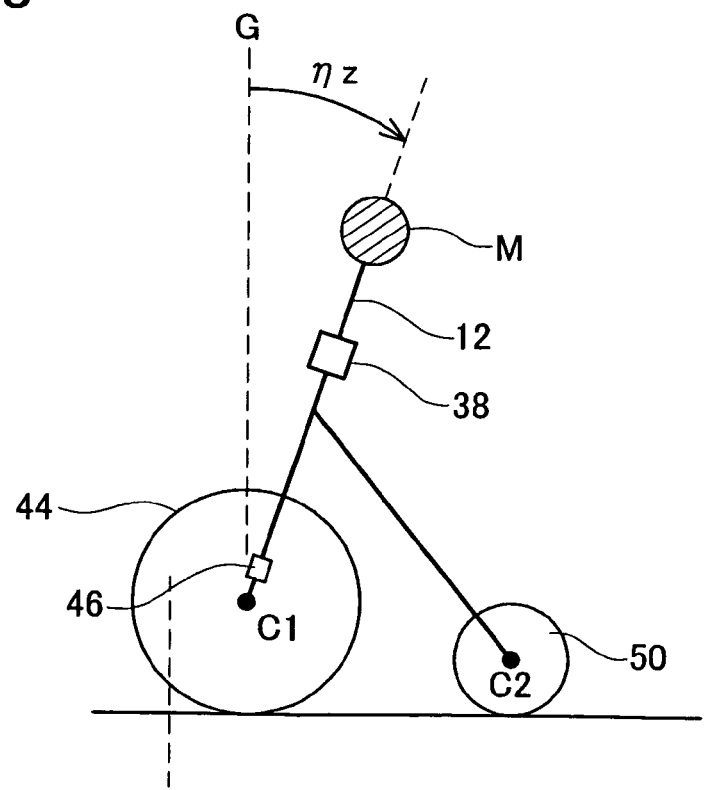
FIG. 3 schematically illustrates the running object in the stable posture.

FIG. 3 schematically illustrates the running object 10 in the stable posture. As shown in FIG. 3, in the stable posture, the driven wheel 50, the first drive wheel 34, and the second drive wheel 44 are placed on the ground. The running object 10 can maintain the stable posture while running, rotating, or being substantially stationary. "$\eta z$" in FIG. 3 illustrates the incline angle of the vehicle body 12 when the driven wheel 50 contacts a horizontal surface. The angle $\eta z$ is the incline angle of the vehicle body 12 while the running object 10 is in the stable posture on the horizontal surface. The angle $\eta z$ is referred to as a predetermined ground incline angle. The incline angle of the vehicle body 12 when the running object 10 is in the stable posture will in fact change due to the incline or roughness of the road surface, and thus not necessarily equal to the predetermined ground incline angle $\eta z$.

Figure 4:
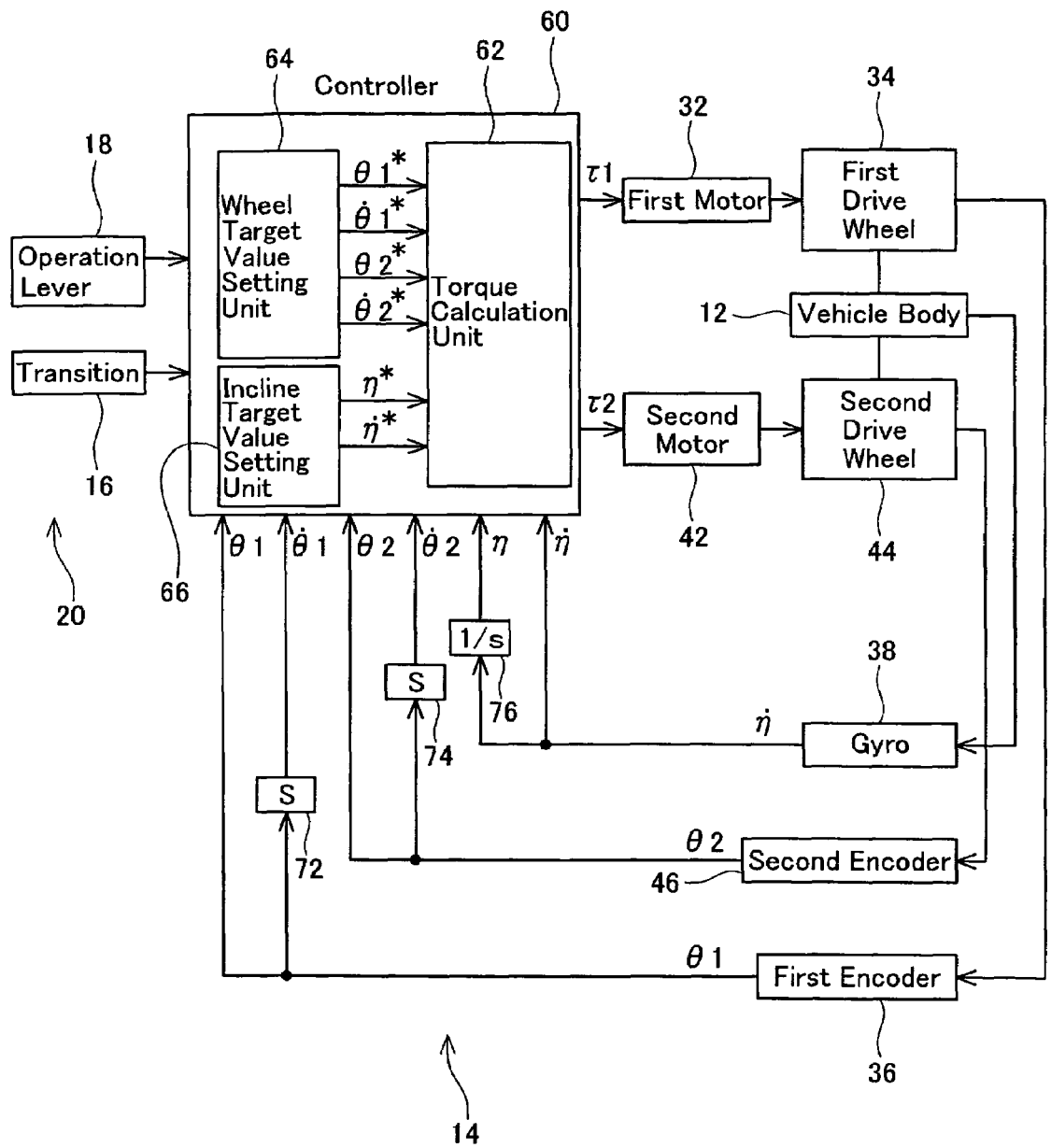
FIG. 4 is a block diagram showing the control structure of the running object.

Next, the control system of the running object 10 will be described. FIG. 4 is a block diagram that shows the configuration of the control system of the running object 10. As shown in FIG. 4, the control unit 14 is primarily equipped with a controller 60 that will adjust the operation of the first motor 32 and the second motor 42, a first differentiating circuit 72, a second differentiating circuit 74, an integrating circuit 76, and the like.

The first differentiating circuit 72 is a circuit that will input an output signal of the first encoder 36, and will output the derivative thereof. In other words, the first differentiating circuit 72 will input the rotation angle $\theta 1$ of the first drive wheel 34 detected by the first encoder 36, and will output the rotation angle velocity $d\theta 1/dt$ of the first drive wheel 34. Note that the variables having a dot on the upper portion thereof in the drawing represent the derivative of that variable. The first encoder 36 and the first differentiating circuit 72 are connected to the controller 60. The detected rotation angle $\theta 1$ and the rotation angle velocity $d\theta 1/dt$ of the first drive wheel 34 will be sequentially input to the controller 60.

The second differentiating circuit 74 is a circuit that will input an output signal of the second encoder 46, and will output the derivative thereof. In other words, the second differentiating circuit 74 will input the rotation angle $\theta 2$ of the second drive wheel 44 detected by the second encoder 46, and will output the rotation angle velocity $d\theta 2/dt$ of the second drive wheel 44. The second encoder 46 and the second differentiating circuit 74 are connected to the controller 60. The detected rotation angle $\theta 2$ and the rotation angle velocity $d\theta 2/dt$ of the second drive wheel 44 will be sequentially input to the controller 60.

The integrating circuit 76 is a circuit that will input the output signal of the gyro 38, and output the integral thereof. In other words, the integrating circuit 76 will input the incline angular velocity $d\eta/dt$ of the vehicle body 12 detected by the gyro 38, and will output the incline angle $\eta$ of the vehicle body 12. The integrating circuit 76 and the gyro 38 are connected to the controller 60. The detected incline angle $\eta$ of the vehicle body 12 and the incline angular velocity $d\eta/dt$ will be sequentially input to the controller 60.

The controller 60 is constructed from a CPU, ROM, RAM, and the like. The controller 60 functionally comprises a vehicle wheel target value setting unit 64, an incline target value setting unit 66, a torque calculation unit 62, and the like.

The vehicle wheel target value setting unit 64 will set, based primarily upon the operational state of the operation lever 18, a target rotation angle $\theta 1^*$ of the first drive wheel 34, a target rotation angle velocity $d\theta 1^*/dt$ of the first drive wheel 34, a target rotation angle $\theta 2^*$ of the second drive wheel 44, and a target rotation angle velocity $d\theta 2^*/dt$ of the second drive wheel 34. Each target value $\theta 1^*$, $d\theta 1^*/dt$, $\theta 2^*$, $d\theta 2^*/dt$ is set in response to the direction and amount of operation of the operation lever 18. Each target value $\theta 1^*$, $d\theta 1^*/dt$, $\theta 2^*$, $d\theta 2^*/dt$ set by the unit 64 will be input to the torque calculation unit 62.

The incline target value setting unit 66 will set, based primarily on the operational state of the operation lever 18 and the transition switch 16, a target value (target incline angle) $\eta^*$ of the vehicle body 12, and a target value (target incline angular velocity) $d\eta^*/dt$ of the vehicle body 12.

In the standing posture, the incline target value setting unit 66 calculates the target values of the incline angle and incline angular velocity of the vehicle body 12 so as to allow the running object 10 to maintain the standing posture. While the transition switch 16 is switched to the standing posture, the incline target value setting unit 66 will sequentially calculate the target incline angle $\eta^*$ and target incline angular velocity $d\eta^*/dt$, and output them to the torque calculation unit 62. The running object 10 runs and stops in response to the operation of the operation lever 18 while maintaining the standing posture. While the transition switch 16 is switched to the stable posture, the incline target value setting unit 66 will not output the target incline angle $\eta^*$ and the target incline angular velocity $d\eta^*/dt$.

Figure 5:
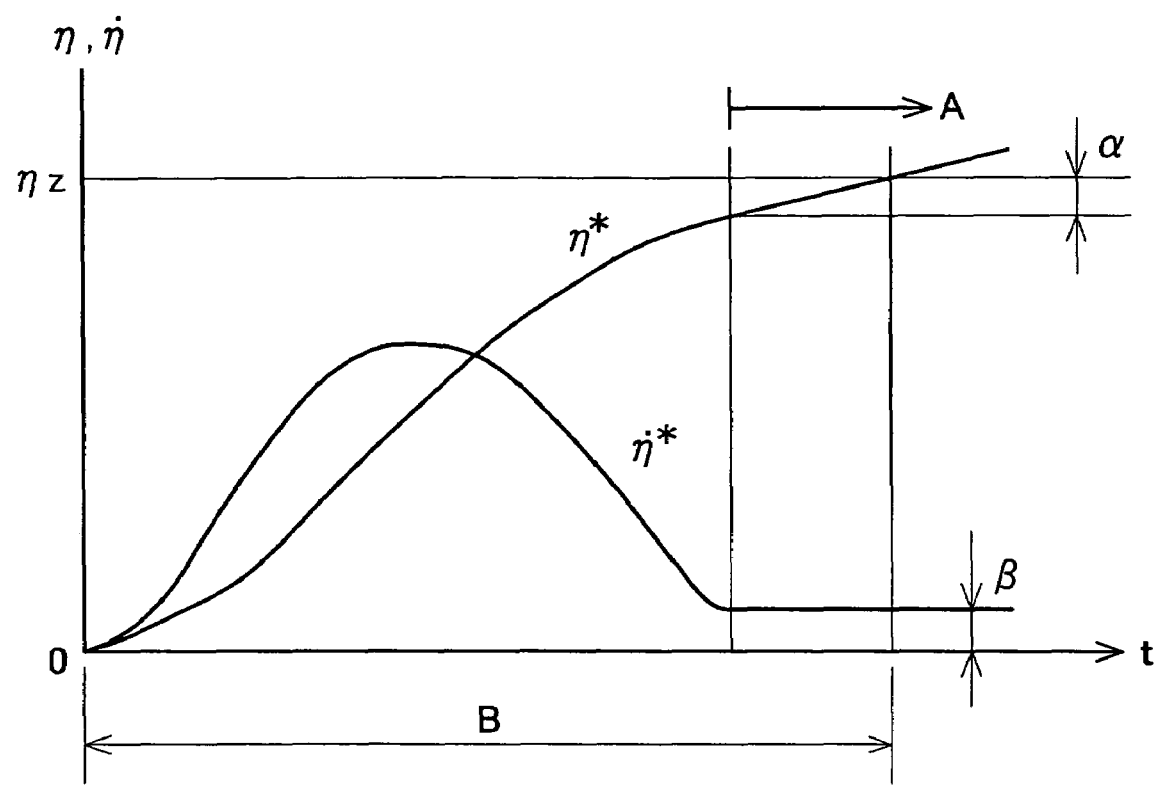
FIG. 5 shows an example of a target incline pattern.

The incline target value setting unit 66 stores a target incline pattern that chronologically describes the target incline angle $\eta^*$ and target incline angular velocity $d\eta^*/dt$ of the vehicle body 12 during the transition from the standing posture to the stable posture. FIG. 5 shows an example of the target incline pattern. "$\eta^*$" in FIG. 5 indicates the target incline angle $\eta^*$ of the vehicle body 12 during the transition from the standing posture to the stable posture. The $\eta^*$ in which a dot is attached in FIG. 5 indicates the target incline angular velocity $d\eta^*/dt$ of the vehicle body 12 during the transition from the standing posture to the stable posture. The derivative of the target incline angle $\eta^*$ is equal to the target incline angular velocity $d\eta^*/dt$.

As shown in FIG. 5, the target incline pattern chronologically describes the target incline angle $\eta^*$ and the target incline angular velocity $d\eta^*/dt$ in a range from a timing when the target incline angle $\eta^*$ is zero to a timing when the target incline angle $\eta^*$ is beyond the predetermined ground incline angle $\eta z$. The target incline angle $\eta^*$ and the target incline angular velocity $d\eta^*/dt$ change continuously and smoothly (mathematically speaking, differentiable). Because the incline angle of the vehicle body 12 when the driven wheel 50 is placed on the ground may sometimes exceed the predetermined ground incline angle $\eta z$ due to the incline or roughness of the road surface, the target incline pattern covers a range in which the target incline angle $\eta^*$ exceeds the predetermined ground incline angle $\eta z$.

In the target incline pattern, the target incline angular velocity $d\eta^*/dt$ is determined to be equal to $\beta$ in a range (shown as "A" in FIG. 5) in which the target incline angle $\eta^*$ exceeds an angle $\eta z-\alpha$, in which a predetermined angle $\alpha$ is subtracted from the predetermined ground incline angle $\eta z$. When the angular velocity $\beta$ is comparatively small, and the incline angular velocity of the vehicle body 12 is limited to the angular velocity $\beta$ at the point at which the driven wheel 50 may contact the ground, the driven wheel 50 can gently come into contact with the road surface. As described above, the incline angle of the vehicle body 12 at timing when the driven wheel 50 contacts the ground will change due to the incline or roughness of the road surface. Because of this, it will be necessary to limit the incline angular velocity of the vehicle body 12 to the angular velocity $\beta$ when there is a possibility that the driven wheel will contact the ground. The predetermined angle $\alpha$ of the target incline pattern of the present embodiment is determined in consideration of the incline and roughness which exists on the road surface, and the angular range (shown as "A" in FIG. 5) that exceeds the angle $\eta z-\alpha$ corresponds to the incline angle of the vehicle body 12 in which there is a possibility that the driven wheel 50 may contact the ground.

The incline target value setting unit 66 will use the stored target incline pattern to set the target incline angle $\eta^*$ and the target incline angular velocity $d\eta^*/dt$ when the transition switch 16 is switched from the standing posture to the stable posture. The operation for transiting the running object 10 from the standing posture to the stable posture will be described in detail below. In contrast, when the transition switch 16 is switched from the stable posture to the standing posture, the incline target value setting unit 66 will set the target incline angle $\eta^*$ to zero, and will also set the target incline angular velocity $d\eta^*/dt$ to zero.

The torque calculation unit 62 will use the deviation between each target value input from the vehicle wheel target value setting unit 64 and the incline target value setting unit 66, and the detected value input from the first encoder 36, the second encoder 46, the gyro 38, the differentiating circuits 72, 74, and the integrating circuit 76. The torque calculation unit 62 will calculate a first torque $\tau 1$ to be output by the first motor 32 and a second torque $\tau 2$ to be output by the second motor 42. The following equations are used to calculate the first torque $\tau 1$ and the second torque $\tau 2$.

$$\tau 1 = K1 \cdot x1 + K2 \cdot x2 + K3 \cdot x5 + K4 \cdot x6$$

$$\tau 2 = K1 \cdot x3 + K2 \cdot x4 + K3 \cdot x5 + K4 \cdot x6$$

Here, x1 is the deviation ($\theta 1^* - \theta 1$) between the target value $\theta 1^*$ of the rotational angle of the first drive wheel 34 and the detected value $\theta 1$ of the rotational angle of the first drive wheel 34. x2 is the deviation ($d\theta 1^*/dt - d\theta 1/dt$) between the target value $d\theta 1^*/dt$ of the rotational angular velocity of the first drive wheel 34 and the detected value $d\theta 1/dt$ of the rotational angular velocity of the first drive wheel 34. x3 is the deviation ($\theta 2^* - \theta 2$) between the target value $\theta 2^*$ of the rotational angle of the second drive wheel 44 and the detected value $\theta 2$ of the rotational angle of the second drive wheel 44. x4 is the deviation ($d\theta 2^*/dt - d\theta 2/dt$) between the target value $d\theta 2^*/dt$ of the rotational angular velocity of the second drive wheel 44 and the detected value $d\theta 2/dt$ of the rotational angular velocity of the second drive wheel 44. x5 is the deviation ($\eta^* - \eta$) between the target value $\eta^*$ of the incline angle of the vehicle body 12 and the detected value $\eta$ of the incline angle of the vehicle body 12. x6 is the deviation ($d\eta^*/dt - d\eta/dt$) between the target value $d\eta^*/dt$ of the incline angular velocity of the vehicle body 12 and the detected value $d\eta/dt$ of the incline angular velocity of the vehicle body 12.

K1 is the feedback gain with respect to the deviations x1, x3 of the rotational angle of each drive wheel 34, 44. K2 is the feedback gain with respect to the deviations x2, x4 of the rotational angular velocity of each drive wheel 34, 44. K3 is the feedback gain with respect to the deviation x5 of the incline angle of the vehicle body 12. K4 is the feedback gain with respect to the deviation x6 of the incline angular velocity of the vehicle body 12.

Note that the method of calculating each torque $\tau 1$, $\tau 2$ is not limited to the aforementioned equations. Various calculation methods that are widely used for feedback control can be adopted. When the transition switch 16 is maintained at the stable posture, feedback control of the incline angle of the vehicle body 12 will not be necessary, and thus the feedback gain K3, K4 can be set to zero.

The controller 60 will adjust the torque output by the first motor 32 to the first torque $\tau 1$ calculated by the torque calculation unit 62. In addition, the controller 60 will adjust the torque output by the second motor 42 to the second torque $\tau 2$ calculated by the torque calculation unit 62. In this way, the rotation angle $\theta 1$ of the first drive wheel 34, the rotational angular velocity $d\theta 1/dt$ of the first drive wheel 34, the rotation angle $\theta 2$ of the second drive wheel 44, the rotational angular velocity $d\theta 2/dt$ of the second drive wheel 44, the incline angle $\eta$ of the vehicle body 12, and the incline angular velocity $d\eta/dt$ of the vehicle body 12 will be adjusted to the target values $\theta 1^*$, $d\theta 1^*/dt$, $\theta 2^*$, $d\theta 2^*/dt$, $\eta^*$, and $d\eta^*/dt$, respectively. In response to the operation of the operation module 20 by the passenger, the running body 10 will change between the standing posture and the stable posture. The running body 10 can run and stop while maintaining the standing posture. The running body 10 also can run and stop while maintaining the stable posture.

Figure 6:
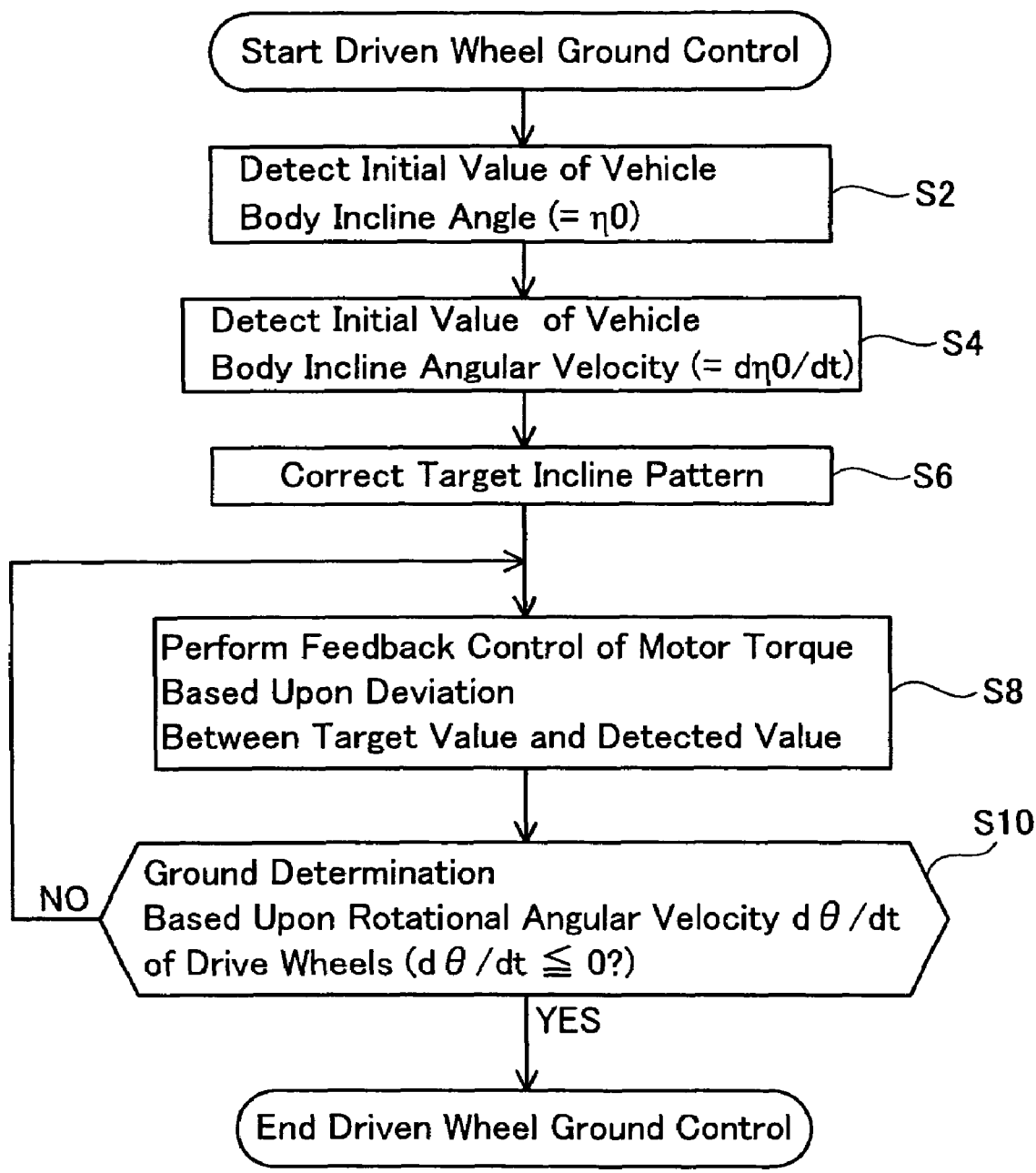
FIG. 6 is a flowchart for transiting the running object from the standing posture to the stable posture.

FIG. 6 shows the operational flow executed by the controller 60 when the running object 10 transits from the standing posture to the stable posture. The operation during the transition from the standing posture to the stable posture by the running object 10 will be described in conjunction with the flow shown in FIG. 6. The controller 60 will start the operation of the flow chart shown in FIG. 6 when the transition switch 16 is switched from the standing posture to the stable posture.

In Step S2, the incline angle η of the vehicle body 12 will be detected, and the initial value η0 of the incline angle of the vehicle body 12 at the timing when the posture transition operation is to begin will be obtained.

In Step S4, the incline angular velocity dη/dt of the vehicle body 12 will be detected, and the initial value dη0/dt of the incline angular velocity of the vehicle body 12 at the timing when the posture transition operation is to begin will be obtained.

Figure 7:
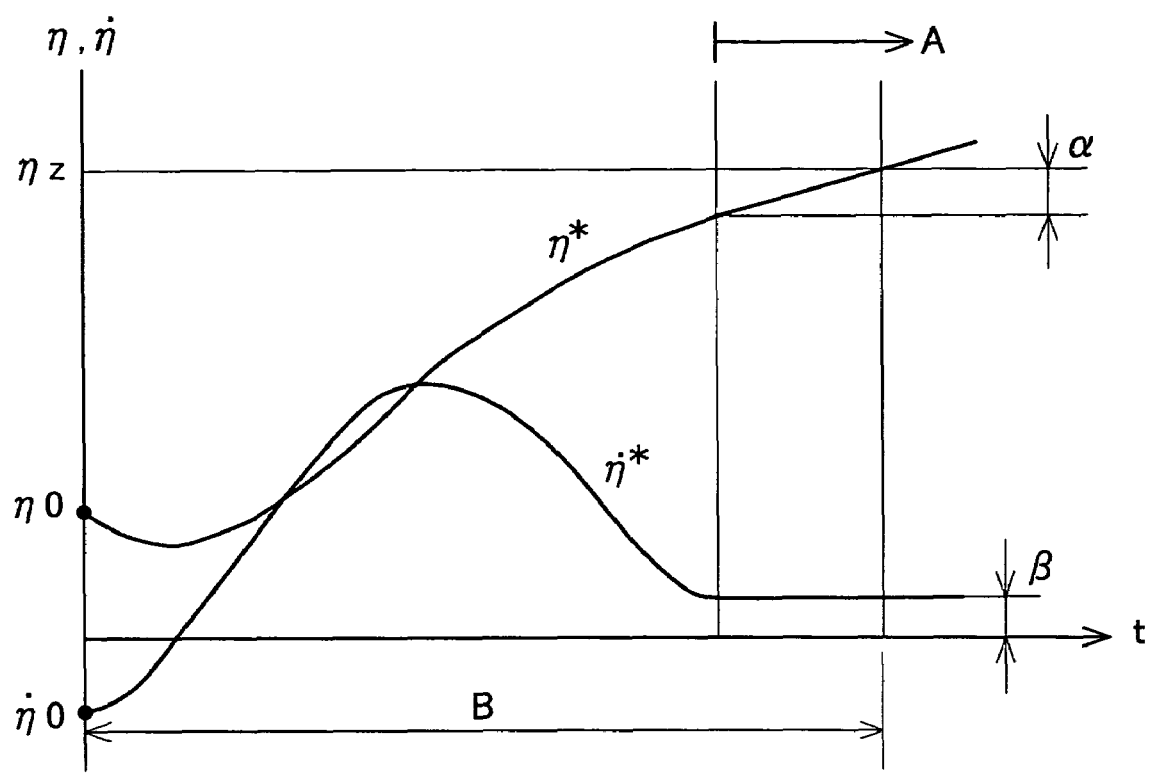
FIG. 7 shows an example of a corrected target incline pattern.

In Step S6, the target incline pattern (see FIG. 5) stored in the incline target value setting unit 66 will be corrected based upon the initial value η0 of the incline angle of the vehicle body 12 detected in Step S2, and the initial value dη0/dt of the incline angular velocity of the vehicle body 12 detected in Step S4. FIG. 7 shows an example of the target incline pattern after correction. As shown in FIG. 7, in the target incline pattern after correction, the initial value of the target incline angle η* is corrected to the initial value η0 detected in Step S2, and the initial value of the target incline angular velocity dη*/dt is corrected to the initial value dη0/dt detected in Step S4. Then, the target incline angle η* will be corrected so as to continuously change from the initial value η0 to the angle ηz-α. As shown in FIGS. 5 and 7, the time period "B" for the target incline angle η* to reach the predetermined ground incline angle ηz is maintained at the same value before and after the correction. In addition, the target incline angular velocity dη*/dt will be corrected so as to continuously change from the initial value dη0/dt to the angular velocity β. The correction can be made by using a trigonometric function for example. Even after the target incline pattern has been corrected, the change rate of target incline angle η*, i.e., the target incline angular velocity dη*/dt, will be determined to be equal to the angular velocity β in the range "A" (see FIG. 7) in which the target incline angle η* exceeds the angle ηz-α in which a predetermined angle α is subtracted from the predetermined ground incline angle ηz.

In Step S8, the corrected target incline pattern will be used to feedback control the torque output from the first motor 32 and the second motor 42. In other words, the incline target value setting unit 66 will set the target incline angle η* and the target incline angular velocity dη*/dt to be the value described in the corrected target incline pattern. Then the incline target value setting unit 66 will out put the set values of the target incline angle η* and the target incline angular velocity dη*/dt to the torque calculation unit 62. The torque calculation unit 62 will calculate the first torque τ1 and the second torque τ2 based upon the deviations between the target incline angle η* and the detected incline angle η, and between the target incline angular velocity dη*/dt and the detected incline angular velocity dη/dt. The controller 60 will adjust the torque output by the first motor 32 to the first torque τ1 calculated by the torque calculation unit 62, and adjust the torque output by the second motor 42 to the second torque τ2 calculated by the torque calculation unit 62. In this way, the incline angle and the incline angular velocity of the vehicle body 12 will be feedback controlled so as to follow the corrected target incline pattern.

In Step S10, it will be determined whether or not the driven wheel 50 is placed on the road surface. The controller 60 will determine whether or not the driven wheel 50 is placed on the road surface by observing the rotational angular velocity of the drive wheels 34, 44. During the transition of the running object 10 from the standing posture to the stable posture, the controller 60 will respond to the target incline angle η* that describes the target incline pattern, and the vehicle body 12 will incline forward toward the driven wheel 50. Because the target incline pattern covers a range in which the target incline angle η* sufficiently exceeds the predetermined ground incline angle ηz, torque will be output from the first motor 32 and the second motor 42 such that that the vehicle body 12 will attempt to incline forward even after the driven wheel 50 is placed on the road. When the driven wheel 50 is placed on the road surface, and the forward incline of the vehicle body 12 is prohibited due to the grounded driven wheel 50, the rotational angular velocity of each drive wheel 34, 44 will significantly change due to the torque output by the first motor 32 and the second motor 42. The controller 60 will determine whether or not the driven wheel 50 is placed on the road surface by detecting a change in the rotational angular velocity of each of the drive wheels 34, 44. In the present embodiment, the running object 10 advances until the driven wheel 50 is placed on the ground, and the running object 10 reverses after the driven wheel is placed on the ground. Therefore, it can be determined that when at least one of the rotational angular velocity of the first drive wheel 34 and the second drive wheel 44 is zero or lower, the driven wheel 50 is placed on the ground. By performing a ground determination for the driven wheel 50 based upon the rotational angular velocity of the drive wheels 34, 44, whether or not the driven wheel 50 is placed on the ground can be correctly determined, even when the incline angle of the vehicle body 12 when the driven wheel 50 is placed on the road surface is different from the predetermined ground angle ηz due to the incline or roughness of the road surface.

Note that the ground determination for the driven wheel 50 is not limited to the aforementioned method. Whether or not the driven wheel 50 is placed on the road surface can also be determined by observing the incline angular velocity of the vehicle body 12.

Feedback control of the motors 32, 42 in Step S8 will be continued until it is determined that the driven wheel 50 is placed on the ground in Step S10. The incline angle and the incline angular velocity of the vehicle body 12 will change substantially identically with the corrected target incline pattern until the driven wheel 50 is on the ground. Even when there is an unexpected incline or roughness on the road surface, the incline angular velocity of the vehicle body 12 will be restricted to the angular velocity β when the driven wheel 50 is placed on the ground. The driven wheel 50 will be softly placed on the road surface. A disturbance in the balance of the running object 10, a feeling of discomfort by the passenger, or the like will be prevented.

Specific examples of embodiments of the present invention are presented above, but these merely illustrate some possibilities of the invention and do not restrict the claims thereof. The art set forth in the claims includes transformations and modifications to the specific examples set forth above.

For example, the front driven wheel is not limited to 1, and a plurality of driven wheels can be provided on the second axle. In addition, a running object can also comprise a third axle arranged to the rear of the first axle, and a rear driven wheel can be placed thereon. In this case, it is preferable that a second target incline pattern be separately prepared in order to place the rear driven wheel on the ground.

Furthermore, the technical elements disclosed in the present specification or figures may be utilized separately or in various combinations and are not limited to the combination set forth in the claims at the time of submission of the application. Furthermore, the art disclosed in the present specification or figures may be utilized to simultaneously realize a plurality of objects or to realize one of these objects.

What is claimed is:

1. A running object comprising:
   a body;
   at least two drive wheels disposed on a first axle;
   at least one driven wheel disposed on a second axle, wherein the at least one driven wheel is suspended in the air while the running object is in a standing posture and the at least one driven wheel is placed on a ground while the running object is in a stable posture;
   a storing device that stores a target incline pattern that chronologically describes a target incline angle of the body during a transition from the standing posture to the stable posture;
   a first detecting device that detects an incline angle and/or an incline angular velocity of the body;
   a torque calculating device that calculates torque based on a deviation between the target incline pattern stored in the storing device and a detection value detected by the first detecting device; and
   an actuator for applying the torque calculated by the torque calculating device to the drive wheels.

2. The running object as in claim 1, wherein velocity of the target incline angle described in the target incline pattern is restricted to be less than or equal to a predetermined velocity within a range in which the target incline angle exceeds a predetermined incline angle.

3. The running object as in claim 2, wherein the predetermined incline angle is an angle calculated by subtracting a predetermined angle from an incline angle of the body while the running object is in the stable posture on a level surface.

4. The running object as in claim 1, further comprising:
   a correcting device that corrects the target incline pattern based on an incline angle and/or an incline angular velocity detected at a start timing of the transition from the standing posture to the stable posture.

5. The running object as in claim 1, further comprising:
   a second detecting device that detects a rotational angular velocity of the drive wheels; and
   a determining device that determines whether or not the driven wheel is placed on the ground based on the rotational angular velocity of the drive wheels detected by the second detecting device.

6. A method of controlling a running object comprising a body, at least two drive wheels disposed on a first axle, and at least one driven wheel disposed on a second axle, the running object being capable of switching between a standing posture in which the driven wheel is suspended in the air and a stable posture in which the driven wheel is placed on the ground, the method comprising:
   storing a target incline pattern that chronologically describes a target incline angle of the body during a transition from the standing posture to the stable posture; detecting an incline angle and/or an incline angular velocity of the body;
   calculating torque based on a deviation between the target incline pattern stored in the storing step and a detection value detected in the detecting step; and
   activating an actuator for applying torque to the drive wheels such that the torque calculated in the calculating step is applied to the drive wheels.

* * * * *